US012600901B2

(12) United States Patent

Fernandez Del Valle et al.

(10) Patent No.: US 12,600,901 B2

(45) Date of Patent: Apr. 14, 2026

(54) LOW VISCOSITY POLYMER-BASED RETARDED ACID

(71) Applicant: Schlumberger Technology Corporation, Sugar Land, TX (US)

(72) Inventors: Julia Fernandez Del Valle, Houston, TX (US); Christopher Daeffler, Sugar Land, TX (US); Mohan Panga, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/579,682

(22) PCT Filed: Jul. 12, 2022

(86) PCT No.: PCT/US2022/036763

§ 371 (c)(1),
(2) Date: Jan. 16, 2024

(87) PCT Pub. No.: WO2023/287746

PCT Pub. Date: Jan. 19, 2023

(65) Prior Publication Data

US 2024/0360355 A1 Oct. 31, 2024

Related U.S. Application Data

(60) Provisional application No. 63/222,763, filed on Jul. 16, 2021.

(51) Int. Cl.
*C09K 8/72* (2006.01)

(52) U.S. Cl.
CPC .................................. *C09K 8/725* (2013.01)

(58) Field of Classification Search
CPC ...................................................... C09K 8/725
See application file for complete search history.

(56) References Cited

U.S. PATENT DOCUMENTS

| | | | |
|---|---|---|---|
| 3,791,446 A | 2/1974 | Tate |
| 3,924,684 A | 12/1975 | Tate |
| 4,079,011 A | 3/1978 | Tate |
| 4,140,640 A | 2/1979 | Scherubel |
| 7,287,587 B2 | 10/2007 | Reddy |
| 8,551,926 B2 | 10/2013 | Huang |

(Continued)

FOREIGN PATENT DOCUMENTS

| | | |
|---|---|---|
| EP | 0278540 B1 | 8/1992 |
| WO | 2014193546 A1 | 12/2014 |

(Continued)

OTHER PUBLICATIONS

Extended Matrix Acidizing Using Polymer-Acid Solutions (Year: 2006).*

(Continued)

*Primary Examiner* — William D Hutton, Jr.
*Assistant Examiner* — Avi T Skaist
(74) *Attorney, Agent, or Firm* — Kyle R. Miiller

(57) ABSTRACT

Treatment of hydrocarbon formations using acid blends that contain water soluble polymers having chemical affinity for acid-susceptible rock species in the hydrocarbon formation is described herein. The polymers retard the activity of acid on acid-susceptible species of rock formations.

17 Claims, 5 Drawing Sheets

(56)     References Cited

U.S. PATENT DOCUMENTS

| | | | |
|---|---|---|---|
| 9,234,126 B2 | 1/2016 | Karale | |
| 9,376,611 B2 | 6/2016 | Berry | |
| 2006/0131017 A1 | 6/2006 | Garcia-Lopez de Victoria | |
| 2014/0353042 A1* | 12/2014 | Karale | C09K 8/725 |
| | | | 175/64 |
| 2016/0024370 A1 | 1/2016 | Ba geri | |
| 2016/0237340 A1* | 8/2016 | Pandya | C09K 8/54 |
| 2021/0215026 A1 | 7/2021 | Godoy-Vargas | |

FOREIGN PATENT DOCUMENTS

| | | | |
|---|---|---|---|
| WO | 2015020688 A1 | 2/2015 | |
| WO | 2017040434 A1 | 3/2017 | |

OTHER PUBLICATIONS

Carpenteret al., "Acidizing with Swellable Polymers" One Petro, Journal of Petroleum Technology, vol. 14, No. 09, Sep. 1, 1962. pp 1041-1047.
Swanson, B. L. "Method And Composition For Acidizing Subterranean Formations" Retrieved from https://www.osti.gov/biblio/6604550, Oct. 25, 1977, 02 pages.

* cited by examiner

TIME (MINS)

MASS REMAINING (%)

TIME (MINS)

MASS REMAINING (%)

HCl15
HCl15 PVP 2500
HCl15 PVP 10k
HCl15 PVP 55k
HCl15 PVP 1M

LOW VISCOSITY POLYMER-BASED RETARDED ACID

CROSS-REFERENCE TO RELATED APPLICATIONS

This application for patent is a National Stage Entry of International Application No. PCT/US2022/036763, filed Jul. 12, 2022, which claims priority to and the benefit of U.S. Provisional Patent Application Ser. No. 63/222,763 filed Jul. 16, 2021, which is entirely incorporated herein by reference.

FIELD

This patent application describes methods and apparatus for stimulating hydrocarbon reservoirs. Specifically, methods and materials for acid treating hydrocarbon formations is described.

BACKGROUND

Almost two-thirds of the world's remaining oil reserves are contained in carbonate containing reservoirs. Such formations have a tendency to be highly heterogeneous, with complex porosity and permeability variations, barriers, and irregular flow paths. In order to increase the productivity of wells in calcareous formation, a range of stimulation techniques can be applied. One of the most common techniques involves the stimulation of the well with acids.

Acids can be injected into the formation to boost production or increase injectivity in oil and gas fields. Stimulation of carbonate containing rocks typically involves the reaction between an acid and the minerals calcite ($CaCO_3$) and dolomite [$CaMg(CO_3)_2$] to enhance the flow properties of the rock. The two main stimulation methods are acid fracturing and matrix acidizing.

Acid fracturing involves the pumping of a viscous pad at injection rates that result in pressures above the fracture pressure to fracture the rock. Once fractures have been created, an acid stage is pumped to etch and form pathways at and near the fracture surfaces. After the treatment, the fracture closes but the pathways—intricate, high-permeability channels—persist, which allows for an increased conductivity between the formation and the well to remain.

Matrix acidizing, in contrast, is performed at injection rates that result in pressures below the fracture pressure. Acids, solvents, and/or other chemical treatments are pumped into the formation. When acids penetrate into the carbonate containing formation, some of the minerals in the rock dissolve creating highly conductive channels.

In carbonate containing reservoirs, hydrochloric acid (HCl) is the most commonly applied stimulation fluid. Organic acids such as formic and acetic acid are used in retarded-acid systems or in high-temperature applications. However, these systems have several limitations. In the case of organic acids, the dissolution of the rock is low when compared to that of HCl, so larger volumes are required to dissolve the same amount of rock. Hydrochloric acid, on the other hand, has a high reaction rate at higher temperatures, meaning that the acid will not penetrate deep into the formation before it is fully spent. To solve these issues, an emulsified acid (acid-in-oil) with a high dissolution capacity and low reaction rates was developed. This fluid system raised other problems such as high friction pressures which limit the pumping rates, Health, Safety and Environmental (HSE) issues due to the use of highly flammable substances (diesel, crude), and quality concerns during the preparation of the emulsion.

Improved retarded acid systems are needed for stimulation of carbonate containing reservoirs.

SUMMARY

Embodiments described herein provide a method of stimulating a hydrocarbon reservoir, the method comprising preparing a single-phase aqueous mixture comprising a strong acid and a water-soluble polymer having chemical affinity for acid-susceptible species in rock formations of the hydrocarbon reservoir; and flowing the aqueous mixture into a carbonate containing formation of the hydrocarbon reservoir.

Other embodiments described herein provide a method, comprising preparing a single-phase aqueous mixture comprising a strong acid and a water-soluble cationic polyacrylamide polymer; and flowing the aqueous mixture into a hydrocarbon reservoir.

DETAILED DESCRIPTION

Figure 1:
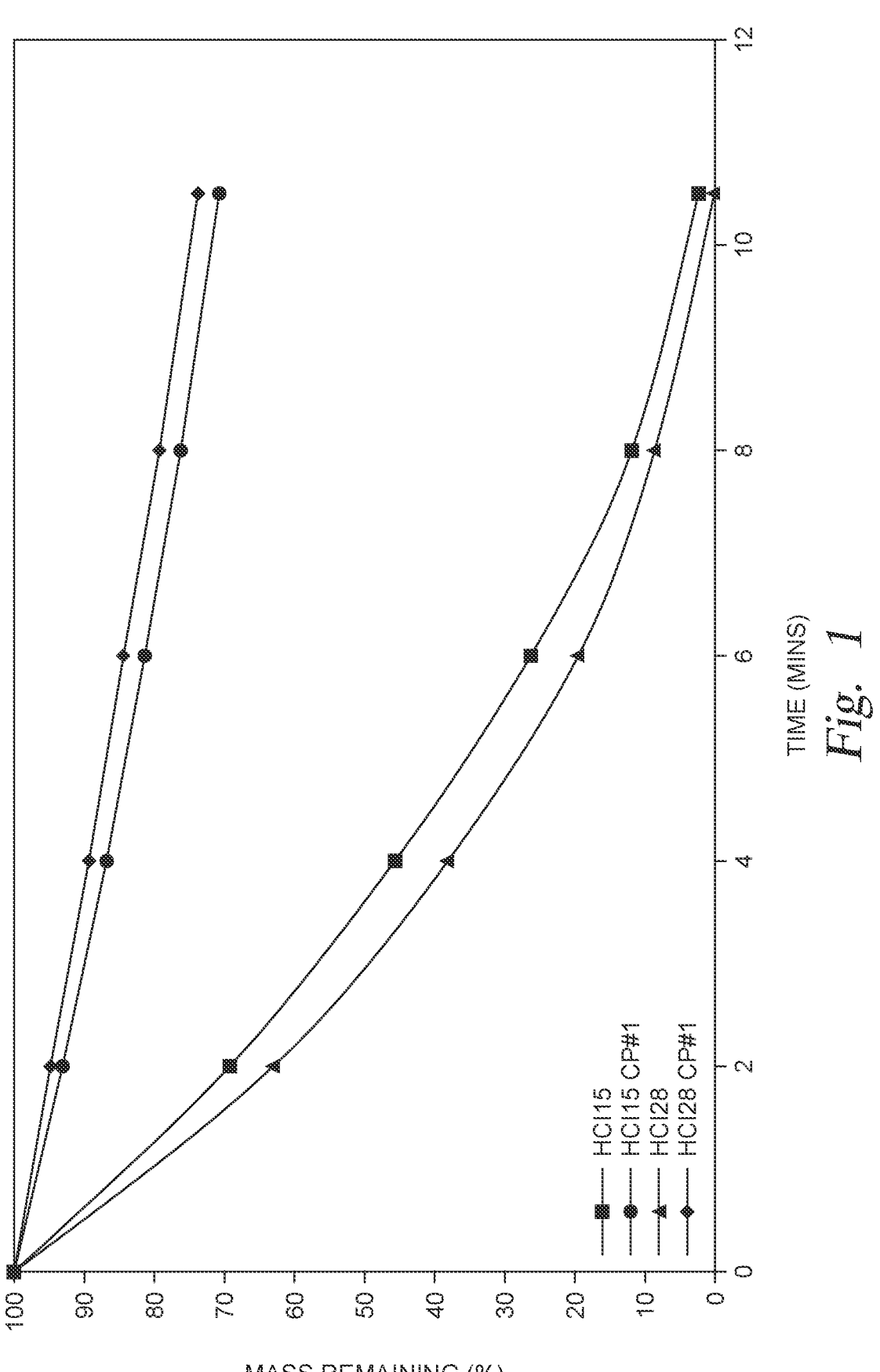
FIG. 1 is a graph showing mass loss of marble cores in conventional acid treatment fluids.

Blending a strong acid solution, for example a solution of HCl, HF, $H_2SO_4$, and/or $HNO_3$ in water, with a water-soluble polymer that has chemical affinity for acid-susceptible sites in rock formations, to form a single-phase mixture and deploying the resulting mixture into a hydrocarbon-bearing formation using a well, can improve utilization of the acid in enhancing hydrocarbon flow from the formation to the well. The compositions described herein are suitable for acid treating carbonate containing formations. Organic acids, such as formic acid and acetic acid, can also be used in such mixtures. Polymers that can be used include poly-alkylene glycols, polyimides, polyimine (i.e. polyethylene imine), polyamides, polyol polymers, polyanhydrides, poly-oxazolines, polyesters, polyacrylic acids, polyacrylates, polyacrylamides, and polymers with water-solubility functionalization such as cationic polymers, for example poly-quaternium polymers such as polyquaternium-15 and dial-lyldimethylammonium chloride (DADMAC) homopolymers and copolymers, among others. Other polymers that can be used include N-vinylimidazole polymers and quaternized derivatives thereof. Copolymers of dichloroethylether with diamines can also be used. Such material are also known a polyquaternium-2, polyquaternium-17, polyquaternium-18, and polyquaternium-27. Mixtures of these polymers with other polymers widely used in acid treatment, such as polyvinylpyrrolidone, polyacrylamide, and polyvinylalcohol, can also be used. Copolymers and multi-polymers of monomer species that form the polymers listed above can also be used. The polymers generally dissolve in aqueous acid solution to yield a single phase liquid mixture. In some cases, the polymers listed above may hydrolyze, partially or completely, in the aqueous acid solution to yield other polymers and oligomers, potentially along with hydrolysis byproducts such as acids and alcohols. The polymers listed above, and their polymer or oligomer byproducts, adhere or associate with acid-susceptible sites of the rock formation to reduce acid attack on such sites, thus prolonging acid penetration into the formation. The polymers listed above can be partially or fully hydrolyzed, and/or partially or fully dissolved in water, prior to mixing with acid solution. Molecular weight of these polymers and polymer mixtures, at the time of adding to an acid mixture, is generally from about 0.1 million Daltons (MDa) to about 1.5 MDa, such as about 0.7 MDa to about 1.3 MDa, for example about 1.0 MDa.

Examples of polyalkylene glycols that can be used include polyethylene glycol and polypropylene glycol. Higher polyalkylene glycols, made from monomer units having up to six carbon atoms, can be used. Mixed polyalkylene glycol polymers, such as polyethylene-polypropylene glycol, or other similar mixed polymers made from monomer unit mixtures with monomer units having up to six carbon atoms, can be used. These mixed polymers can be random or block polymers, which can have arbitrary block sizes and numbers.

Examples of polyimide polymers that can be used include polymers made from diamine monomers having water-solubilizing substituents such as acetate groups, alkyl ester groups, acylamine groups, and the like. In such polymers the imide group or groups can be part of the polymer chain backbone or may be incidental or auxiliary to the polymer chain backbone.

Examples of polyamides that can be used include polymers and oligomers of all naturally-occurring amino acids, such as polylysine, polyglutamic acid, polyglycine, and the like. Copolymers and multi-polymers of different amino acids can be used as well. In some cases, small proteins can be used. Non-naturally-occurring amino acids that are water-soluble can be used as well. Polyoxazolines are types of amide polymers where the amide linkage is pendant from the main chain of the polymer.

Polyethylene imines can be linear or branched to any desired degree, and may include substituents to adjust the degree of water-solubility. Substituted imine monomers can be polymerized to yield functionalized or substituted PEI, or PEI can be functionalized following polymerization. The functionalization can increase water-solubility if hydrophilic substituents are added to the polymer. Alternately, the functionalization can decrease water-solubility if hydrophobic substituents are added.

Polyol polymers are generally polymers that have a plurality of hydroxyl groups attached as substituents. Such polymers can be used in the compositions herein, and may have hydroxyl numbers selected to provide desired properties such as water-solubility, viscosity, and adhesion to formation species.

In polyanhydride polymers, the density of the anhydride linkages will govern the water-solubility of the polymers, and the backbone units linked by the anhydride linkages will govern other polymer properties such as molecular weight, and will affect fluid properties, such as viscosity, of the treatment mixture. In acid, some such polymers will hydrolyze according to an equilibrium that can affect how the mixture performs. The equilibrium can be adjusted toward polymer or monomer by adding reagents to the mixture or by copolymerizing anhydride units with other units. For example, copolymerizing hydrophobic anhydride units with other hydrophilic units can affect hydrolysis behavior of the polymers.

Polymers functionalized to confer water solubility can also be used. These can be made from functionalized monomers and/or functionalization can be added following polymerization. Some examples include ester-functionalized polymers and polymers functionalized to include ionic sites. An example of an ionically functionalized polymer is a cationic polyacrylamide such as choline methacrylate-acrylamide copolymer.

Naturally-occurring polymeric substances can also be used or included in the mixtures described herein. Starches, cellulose, and polysaccharides, which can be modified or unmodified, can be included in the acid treatment mixtures described herein to adjust fluid properties such as viscosity and rock surface affinity. Examples include guar, xanthan, chitosan, and derivatives thereof, and functionalized starches and celluloses.

Other processing aids can be included in the mixtures described herein. At least some components widely used in the industry as friction reducers, scale inhibitors, biocides, corrosion inhibitors, chelating reagents, viscosifiers, surfactants, solvents, iron control reagents, clay stabilizers, diversion agents, and $H_2S$ scavengers are compatible with the mixtures described herein and can be added, or used with, these mixtures.

The solutions described herein are generally single-phase aqueous mixtures that can be used directly to stimulate a hydrocarbon formation, or can be blended with other ingredients that may result in a two-phase, or multi-phase, mixture. In one example, propping agents may be included in the mixture, resulting in a two-phase mixture. In another example, nitrogen, carbon dioxide, and volatile hydrocarbons such as methane and ethane, and combinations of these, can be used to create bubbles in the acidizing fluid or even to foam the acidizing fluid before introduction downhole. Adding a gas phase to the acidizing fluid can reduce the specific volume of acidizing fluid that must be used to treat a given formation.

EXAMPLES

Example 1 shows how polymers act as acid retarders in various acid concentrations whereas Examples 2 through 6 explore the use of different types of polymers at concentrations ranging from 0.05 to 0.25 g/100 mL of fluid in 15% HCl.

Example 1

Mass loss experiments were conducted at room temperature to test the performance of a cationic polyacrylamide in hydrochloric acid on a carbonate containing material. This cationic polyacrylamide, referred to as CP #1, was added at a concentration of 0.25 g/100 mL of fluid. A marble (Burlington limestone) core 1″ in diameter×0.25″ in thickness was dissolved in the fluid. The mass loss was tracked over 10.5 minutes. To show the retardation effect CP #1 has at acid concentrations ranging from 15 to 28% HCl, control fluids containing no polymer were also tested.

FIG. 1 is a graph showing mass loss of marble cores in control fluids. FIG. 1 shows how the control fluids (HCl 15 and HCl 28) fully dissolve the marble cores in less than 11 minutes, whereas the fluids containing CP #1 experience a reduced mass loss within the same period. The retardation effects provided by CP #1 are similar despite of the acid concentration difference. The data of FIG. 1 show slightly more retardation at higher acid concentrations.

Example 2

To show how the polymer concentration influences retardation, mass loss experiments were conducted at room temperature to test the performance of CP #1 in hydrochloric acid at polymer concentrations ranging from 0.05 g/100 ml of fluid to 0.25 g/100 mL in both 15 and 28% HCl. A marble (Burlington limestone) core 1" in diameter×0.25" in thickness was dissolved in each fluid and the mass loss was tracked over 10.5 minutes. Control fluids containing straight acid (15 and 28% HCl) were used as a baseline.

Figure 2:
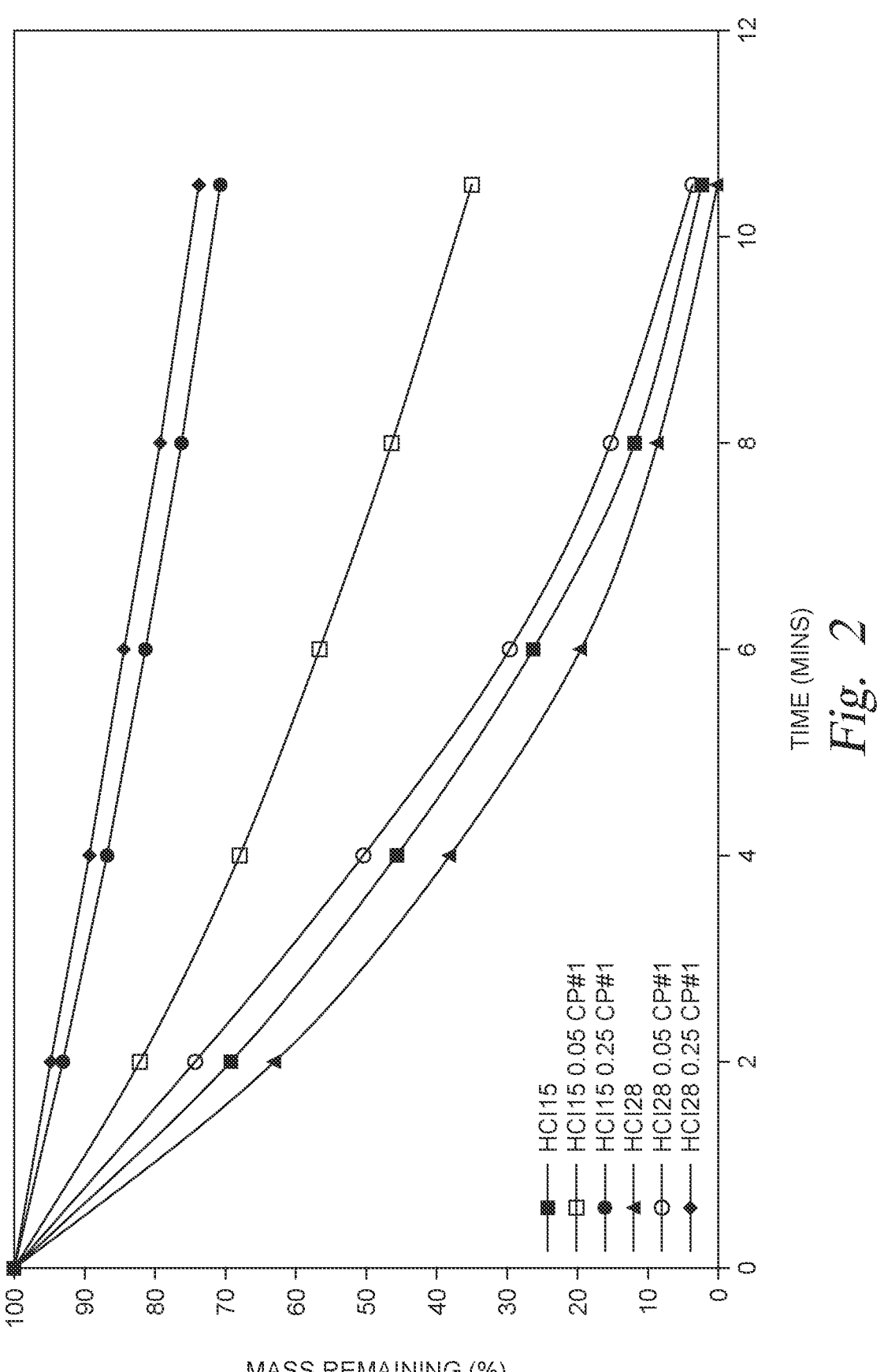
FIG. 2 is a graph showing mass loss of marble cores in acid treatment solutions according to one embodiment.

FIG. 2 is a graph showing mass loss of marble cores in the different solutions. As shown in FIG. 2, CP #1 is an acid retarding agent in both 15 and 28% HCl even when lowering the polymer concentration to 0.05 g/100 mL of fluid. This is particularly the case for CP #1 in 15% HCl, which provides more retardation at 0.05 g/100 mL of fluid than in 28% HCl at the same concentration. The retardation effects are greater as more polymer is added regardless of the acid concentration. The data of FIG. 2 show less retardation of the high acid concentration fluid at the low concentration of retardant than of the low acid concentration fluid.

Example 3

Mass loss experiments were conducted to test the performance of ~1 million Da polyvinylpyrrolidone (PVP) in hydrochloric acid at polymer concentrations ranging from 0.05 g to 0.25 g/100 mL of fluid. A marble (Burlington limestone) core 1" in diameter×0.25" in thickness was dissolved in each fluid and the mass loss was tracked over 10.5 minutes. A control fluid containing straight acid (15% HCl) was used to highlight the retardation effects provided by PVP.

Figure 3:
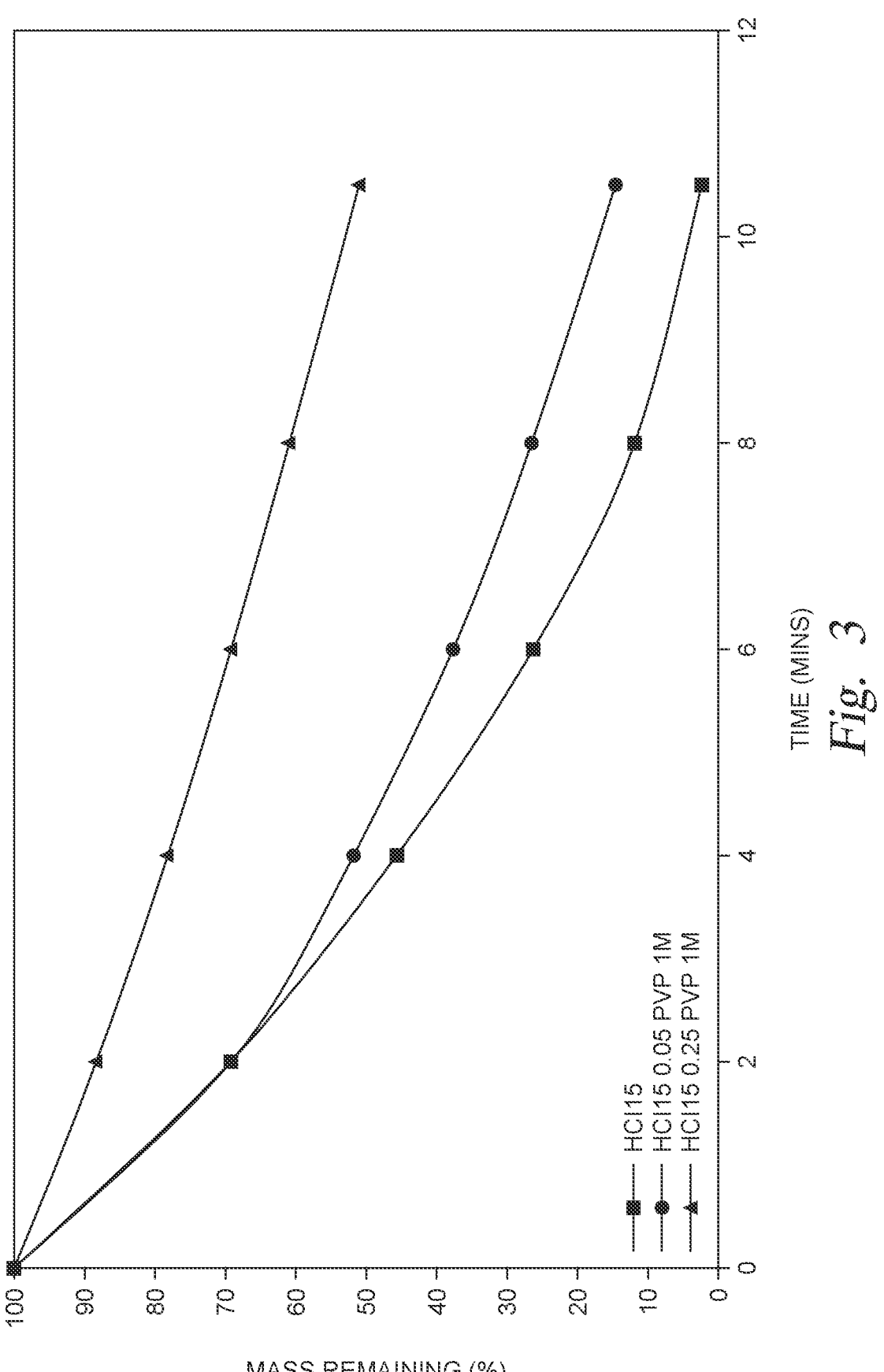
FIG. 3 is a graph showing mass loss of marble cores in acid treatment solutions according to another embodiment.

FIG. 3 is a graph showing mass loss of marble cores in different solutions. FIG. 3 compares the marble core mass remaining periodically when placed in fluids containing PVP of 1M Da. PVP slows down the reaction between the acid and the core as demonstrated by the reduced mass loss of the core. At higher PVP concentrations, the polymer provides significant retardation effects when compared to the control fluid.

Example 4

To explore the use of lower molecular weight polymers as acid retarding agents, mass loss experiments were conducted to test the performance of various PVP's in hydrochloric acid (15% HCl). The PVPs tested had molecular weights ranging from 2.5 kDa to 1 million Da. The polymer concentration was of 0.25 g/100 mL of fluid. A marble (Burlington limestone) core 1" in diameter×0.25" in thickness was dissolved in each fluid and the mass loss was tracked over 10.5 minutes. A control fluid containing straight acid (15% HCl) was used to highlight the retardation effects provided by PVP.

Figure 4:
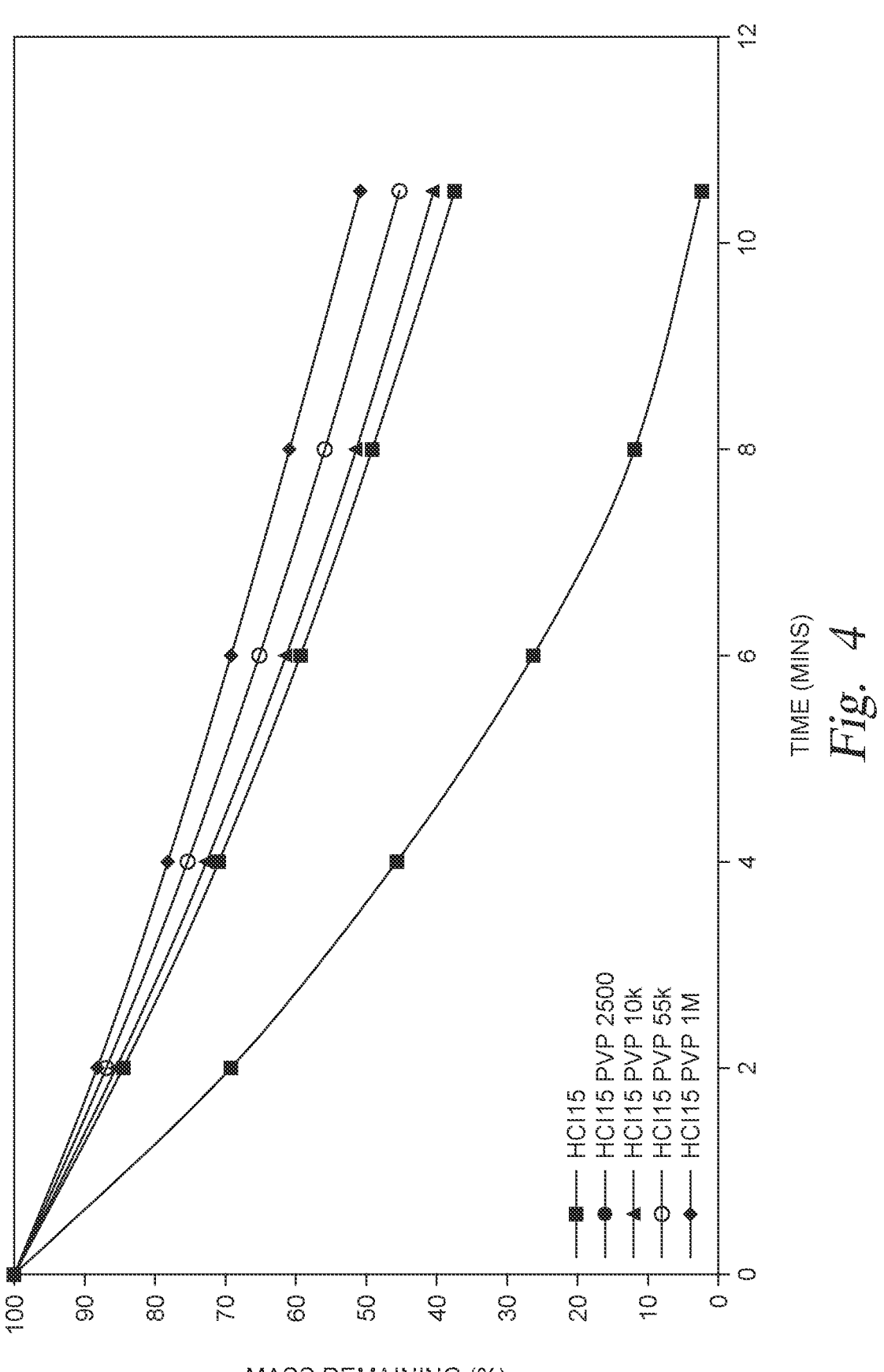
FIG. 4 is a graph showing mass loss of marble cores in acid treatment solutions according to another embodiment.

FIG. 4 is a graph showing mass loss of marble cores in different solutions. As shown in FIG. 4, PVP retards the reaction of the acid with the rock, evidenced by the reduced mass loss at the given intervals. The retardation effects increase with increasing molecular weight, with PVP of 1 million Da providing more retardation than PVP of lower molecular weight, other aspects being equal.

Example 5

Mass loss experiments were conducted to test the performance of three polyacrylamides: two cationic polymers (CP #1 and CP #2) and a partially hydrolyzed polyacrylamide (PHPA). The polymer concentration used was of 0.25 g/100 ml of 15% HCl. A marble (Burlington limestone) core 1" in diameter×0.25" in thickness was dissolved in each fluid and the mass loss was tracked over 10.5 minutes. A control fluid containing straight acid (15% HCl) was used to highlight the retardation effects provided by the polyacrylamides.

Figure 5:
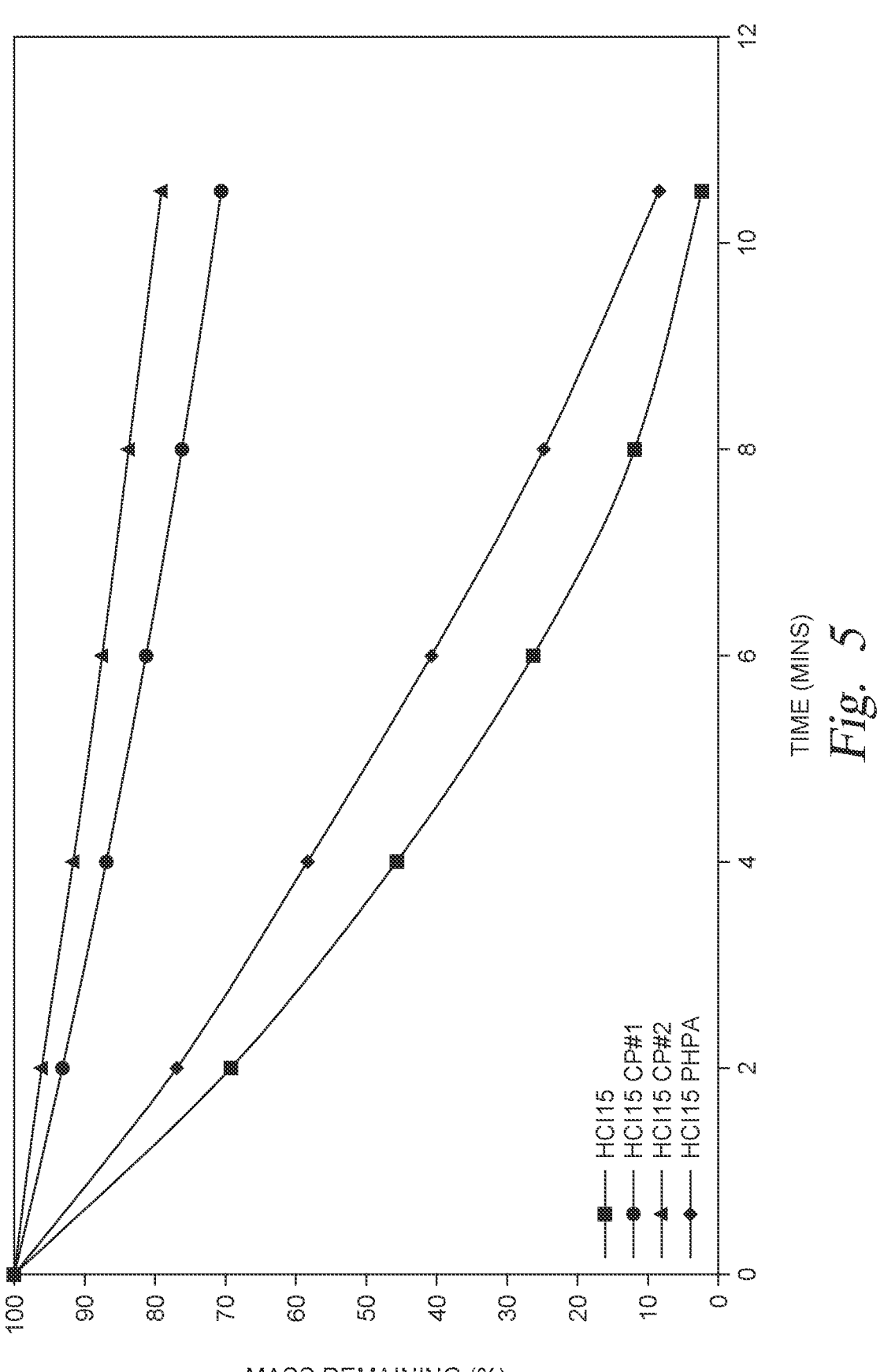
FIG. 5 is a graph showing mass loss of marble cores in acid treatment solutions according to another embodiment.

FIG. 5 is a graph showing mass loss of marble cores in different solutions. FIG. 5 presents a comparison of the acid retardation resulting from the addition of each polyacrylamide to 15% HCl. CP #2 is the best retarding agent, followed closely by CP #1. PHPA also provides retardation but to a lesser degree.

In practice, a single-phase aqueous acid treatment fluid, as described herein, is blended at a well site for treatment of a hydrocarbon reservoir using the well. The hydrocarbon reservoir may have a carbonate containing formation. The single-phase aqueous acid treatment fluid may be pumped directly downhole or may be preceded by one or more preparation treatments. For example, in some cases a pre-flush may be performed using water, brine, acid, or an acid-salt mixture, and after the pre-flush treatment the single-phase aqueous acid treatment fluid may be pumped downhole.

Pumping of the single-phase aqueous acid treatment fluid may be followed by a placement operation in which a fluid is pumped downhole to place the single-phase aqueous acid treatment fluid at a target location deeper within the hydrocarbon reservoir. Water or brine can be used to place the aqueous acid treatment fluid. The single-phase aqueous acid treatment fluid can be pumped downhole in more than one operation, and such operations can be separated by pumping brine or water.

The approach described herein for making and using single-phase aqueous acid treatment fluids result in single-phase acid formulations having reduced reaction rates with acid susceptible components of geologic formations, such as carbonate containing features. These treatment fluids can be used to prevent overly rapid dissolution of carbonate materials in a geologic formation until the treatment fluid is placed at a desired location in the formation. Such treatment fluids can also be used for perforation cleaning treatments to remove acid-susceptible perforation debris using a single-phase acid treatment fluid having limited reaction rate with the acid-susceptible formation from which the perforation debris is being flushed.

While the foregoing is directed to embodiments of the present invention, other and further embodiments of the present disclosure may be devised without departing from the basic scope thereof, and the scope thereof is determined by the claims that follow.

We claim:

1. A method of stimulating a hydrocarbon reservoir, the method comprising:

preparing a single-phase aqueous mixture comprising a strong acid and a water-soluble polymer, wherein the water-soluble polymer is a polyalkylene glycol, a polyimide, a polyimine, a polyamide, a polyol, a polyanhydride, a polyoxazoline, or a mixture, copolymer, or multipolymer thereof, and wherein the water-soluble polymer is present in the aqueous mixture at a concentration of from 0.05 g/100 mL to 0.25 g/100 mL;

flowing the aqueous mixture into a carbonate containing formation of a hydrocarbon reservoir; and contacting the carbonate containing formation with the aqueous mixture, wherein the strong acid dissolves a portion of the carbonate containing formation, thereby creating conductive channels within the formation, and wherein the water-soluble polymer reduces a reaction rate of the strong acid with the carbonate containing formation.

2. The method of claim 1, wherein the aqueous mixture further comprises one or more materials selected from the group consisting of friction reducers, scale inhibitors, biocides, corrosion inhibitors, chelating reagents, viscosifiers, surfactants, solvents, iron control reagents, clay stabilizers, diversion agents, and $H_2S$ scavengers.

3. The method of claim 1, wherein the aqueous mixture further comprises a polyacrylamide, a polyvinylpyrrolidone, or a mixture, copolymer, or other combination thereof.

4. The method of claim 1, wherein the aqueous mixture comprises more than one water-soluble polymer.

5. The method of claim 1, wherein the more than one water-soluble polymer comprises a cationic polyacrylamide, and wherein the cationic polyacrylamide is a polyquaternium polymer.

6. The method of claim 1, wherein:
the strong acid is hydrochloric acid;
the hydrochloric acid is present in the aqueous mixture at a concentration between 15% by weight and 28% by weight, calculated to a total weight of the aqueous mixture; and
the water-soluble polymer is a cationic polyacrylamide polymer.

7. A method, comprising:
preparing a single-phase aqueous mixture comprising a strong acid and a water-soluble cationic polyacrylamide polymer, wherein the cationic polyacrylamide polymer is present in the aqueous mixture at a concentration of from 0.05 g/100 mL to 0.25 g/100 mL;
flowing the aqueous mixture into a carbonate containing formation of a hydrocarbon reservoir; and
contacting the carbonate containing formation with the aqueous mixture, wherein the strong acid dissolves a portion of the carbonate containing formation, thereby creating conductive channels within the formation, and wherein the cationic polyacrylamide polymer reduces a reaction rate of the strong acid with the carbonate containing formation.

8. The method of claim 7, wherein the aqueous mixture further comprises one or more materials selected from the group consisting of friction reducers, scale inhibitors, biocides, corrosion inhibitors, chelating reagents, viscosifiers, surfactants, solvents, iron control reagents, clay stabilizers, diversion agents, and $H_2S$ scavengers.

9. The method of claim 7, wherein the aqueous mixture further comprises an additional water-soluble polymer selected from the group consisting of a polyalkylene glycol, a polyimide, a polyimine, a polyamide, a polyol, a polyanhydride, a polyoxazoline, a polyacrylamide, a polyvinylpyrrolidone, a polyvinylalcohol, or a mixture, copolymer, or multipolymer thereof.

10. The method of claim 7, further comprising applying a pre-flush treatment to the hydrocarbon reservoir before flowing the aqueous mixture into the hydrocarbon reservoir.

11. The method of claim 9, wherein the additional water-soluble polymer comprises an amino acid.

12. The method of claim 11, wherein the additional water-soluble polymer is a polyquaternium polymer.

13. The method of claim 7, wherein:
the strong acid is hydrochloric acid; and
the hydrochloric acid is present in the aqueous mixture at a concentration between 15% by weight and 28% by weight, calculated to a total weight of the aqueous mixture.

14. A method, comprising:
obtaining a single-phase aqueous mixture comprising a strong acid and a water-soluble cationic polyacrylamide polymer, wherein the cationic polyacrylamide polymer is present in the aqueous mixture at a concentration of from 0.05 g/100 mL to 0.25 g/100 mL;
flowing the aqueous mixture into a carbonate containing formation of a hydrocarbon reservoir; and
contacting the carbonate containing formation with the aqueous mixture, wherein the strong acid dissolves a portion of the carbonate containing formation, thereby creating conductive channels within the formation, and wherein the cationic polyacrylamide polymer reduces a reaction rate of the strong acid with the carbonate containing formation.

15. The method of claim 14, wherein the aqueous mixture further comprises one or more materials selected from the group consisting of friction reducers, scale inhibitors, biocides, corrosion inhibitors, chelating reagents, viscosifiers, surfactants, solvents, iron control reagents, clay stabilizers, diversion agents, and $H_2S$ scavengers.

16. The method of claim 14, wherein the cationic polyacrylamide polymer is a polyquaternium polymer.

17. The method of claim 14, wherein:
the strong acid is hydrochloric acid; and
the hydrochloric acid is present in the aqueous mixture at a concentration between 15% by weight and 28% by weight, calculated to a total weight of the aqueous mixture.

* * * * *